United States Patent
Tsukada

(10) Patent No.: US 7,314,283 B2
(45) Date of Patent: Jan. 1, 2008

(54) COLOR CORRECTION METHOD AND DEVICE FOR PROJECTOR

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/375,034

(22) Filed: Feb. 28, 2003

(65) Prior Publication Data

US 2003/0164927 A1  Sep. 4, 2003

(30) Foreign Application Priority Data

Mar. 1, 2002 (JP) ............... 2002-056043
Feb. 26, 2003 (JP) ............... 2003-048745

(51) Int. Cl.
G03B 21/00 (2006.01)
G09G 5/02 (2006.01)
G09G 5/06 (2006.01)

(52) U.S. Cl. ............ 353/121; 353/31; 353/69; 345/590

(58) Field of Classification Search ............ 353/69, 353/70, 121, 122, 21, 31; 348/745; 345/589–599, 345/207, 690
See application file for complete search history.

(56) References Cited

U.S. PATENT DOCUMENTS

| 6,560,358 B1 * | 5/2003 | Tsukada ............... 382/167 |
| 6,597,410 B1 * | 7/2003 | Doany et al. ............ 348/744 |
| 6,624,828 B1 * | 9/2003 | Dresevic et al. ........ 345/771 |
| 2002/0015043 A1 * | 2/2002 | Matsuda .................. 345/596 |
| 2002/0051001 A1 * | 5/2002 | Kanai ..................... 345/591 |
| 2002/0150293 A1 * | 10/2002 | Kagawa et al. ......... 382/167 |
| 2002/0180766 A1 * | 12/2002 | Wada ..................... 345/690 |
| 2003/0058252 A1 * | 3/2003 | Matsuda et al. ........ 345/589 |
| 2003/0117413 A1 * | 6/2003 | Matsuda .................. 345/589 |
| 2003/0179211 A1 * | 9/2003 | Wada et al. ............. 345/589 |

FOREIGN PATENT DOCUMENTS

| JP | 9-271036 A | 10/1997 |
| JP | 2973477 B2 | 9/1999 |
| JP | 3072729 B2 | 6/2000 |
| JP | 2001-320725 A | 11/2001 |
| JP | 2001-337665 A | 12/2001 |
| JP | 2002-41016 A | 2/2002 |

OTHER PUBLICATIONS

Tajima, Color Image Copying—Foundations of Color Management, Maruzen, (1996), Chapter 3 "Color Reproduction of Display", pp. 33-39.
T. Suzuki et al., "Adaptive Quality Improvement Method for Video Sequence Using Scene Change Detection", Proceedings of IEICE System Society Conference 2001, D-11-88, pp. 173.

* cited by examiner

Primary Examiner—Andrew T Sever
(74) Attorney, Agent, or Firm—Sughrue Mion, PLLC

(57) ABSTRACT

A white image is projected on a projection surface with a projector and color information of the white image is captured by a color sensor 11. A color transformation providing color appearance matching is generated based on color space of an input image and color space on the projection surface, and is stored in a memory. The color of the input image is subjected to color correction using the color transformation. After subjected to gamma correction if necessary, the color-corrected image is output to the projector.

22 Claims, 8 Drawing Sheets

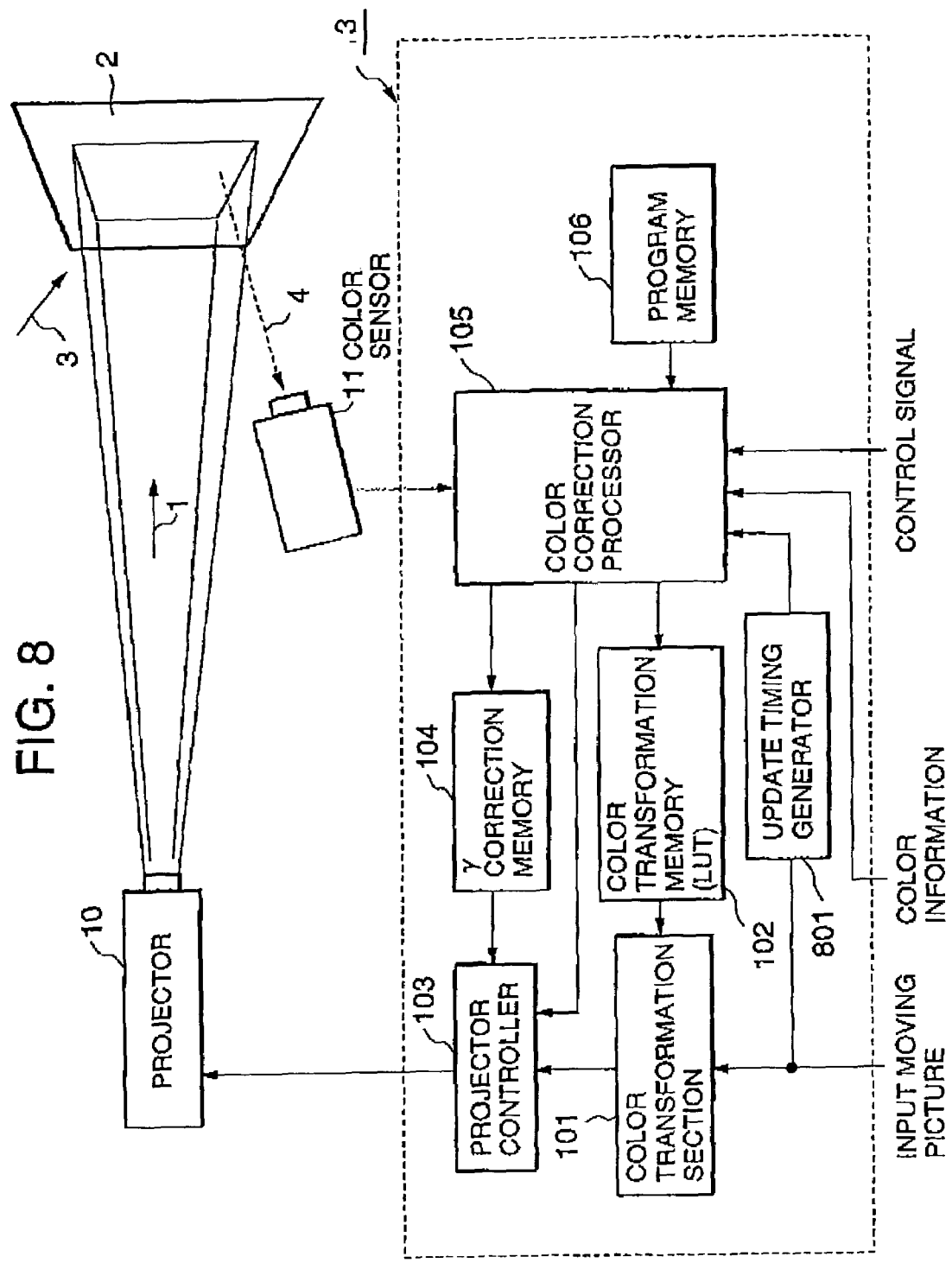

COLOR CORRECTION METHOD AND DEVICE FOR PROJECTOR

BACKGROUND OF THE INVENTION

1. Field of the Invention

The present invention relates to a color correction technique for a projector and in particular to a color correction method and device taking into account the ambient light in visual environment and the surface color of a screen or a wall on which the projector projects color images.

2. Description of the Related Art

Recently, the color reproduction performance of a projector has improved rapidly and thereby the demand for highly accurate color reproduction to the extent of CRT monitors is growing more and more. There is commercially available a CRT monitor, which is equipped with a sensor for capturing environment light and performs color correction of color images depending on the captured visual environment information before displaying.

On the other hand, in the case of projectors, the surface color of a projection plane is not always white. Accordingly, it is necessary to adjust while balance and brightness depending on the surface color of the projection plane. An example of a projector equipped with such an adjustment circuit has been disclosed in Japanese Patent No. 2973477. This conventional projector detects the color and brightness of the projection plane and adjusts the white balance and brightness based on the detected color and brightness information.

Further, in the case of projectors, not only the surface color of screen or wall but also ambient light affects the color reproduction of a projector. There is disclosed an environment-adaptive projector which is designed with consideration given to influences of such environment in Japanese Patent Application Unexamined publication No. 2001-320725. More specifically, a color sensor measures color information such as RGB or XYZ values from the projection surface on which a white image is projected. The obtained color information of the white projected image is mapped to the CIELab space of the predetermined standard white. When the coordinate values for the actual white are not on the L axis, a bound vector is calculated as the origin within the ab plane at the point where the ab plane intersects the L axis. Then, an inverse vector of the bound vector is obtained as indicating a complementary color, which is output as a corrected color. In practice, such a color correction is repeatedly performed for plural levels of gray and the results are stored in a gamma-correction lookup table (LUT).

However, the conventional projector described in Japanese Patent No. 2973477 adjusts only the white balance and brightness without consideration of color appearance of color images. Accordingly, the color appearance of the whole image cannot be close to a desired color. Since the human color perception is complicated and the color appearance is frequently affected by the view environment and white color, a simple adjustment of white balance and brightness cannot achieve color appearance correspondence.

The adaptive projector described in the publication No. 2001-320725 cannot always obtain satisfactory color reproduction due to the following reasons.

Even if a complementary color to the white color on a projection plane is projected, its reproduced color on the projection plane is not always a gray or achromatic color depending on the spectral reflectance characteristics of the projection plane.

It cannot be determined whether the projected white subjected to color correction using the complementary color pair is a desired white color on the projection plane. There will be developed a color shift problem unless the actual color reproduction physically matches the color correction using the complementary color pair. According to the conventional adaptive projector, the case of color shift occurrence is not considered at all.

As to colors other than achromatic colors, subjected to the color correction using the complementary color pair, it does not ensure that the color appearance of such color becomes desired color appearance in the case where the projected white is different from a standard white due to influences of the visual environment such as the surface color of the projection plane and the ambient light. The human color perception has a complicated mechanism having chromatic adaptation or color constancy. Therefore, the conventional simple color correction using a complementary color pair cannot achieve color appearance matching under different lighting environments or different reference whites.

As described above, the projected image of a projector is subjected to physical influences of the surface color of the projection plane and the ambient light and our color perception is also subjected to the same influences. In such situations, the conventional color correction using simple white balance adjustment or a complementary color pair cannot achieve color appearance matching between the color appearance of the reproduced image on the projection plane and the desired color appearance.

SUMMARY OF THE INVENTION

An object of the present invention is to provide a color correction method and device for a projector allowing the color appearance of a reproduced image on a projection plane to match a desired color appearance under an observation condition physically subjected to the surface color of the projection plane and ambient light.

According to an aspect of the present invention, a color correction method for a projector, includes the steps of: a) projecting at least one image onto a projection surface; b) capturing color information of said at least one projected image on the projection surface; c) generating color transformation providing color appearance matching based on i) at least one of a color space derived from color information of an input image and a predetermined color space, and ii) a color space derived from the color information of said at least one projected image, and d) transforming color of the input image according to the color transformation to produce a corrected-color image to be outputted to the projector.

According to another aspect of the present invention, a color correction method for a projector, includes the steps of: a) projecting at least one image onto a projection surface; b) capturing color information of said at least one projected image on the projection surface; c) generating a color space on the projection surface from the color information of said at least one projected image; d) generating color transformation providing color appearance matching based on an input-side color space and the color space on the projection surface; and e) transforming color of an input image according to the color transformation to produce a corrected-color image to be outputted to the projector.

A color correction device according to the aspect of the present invention includes: a color information generator for generating color information of at least one projected image on a projection surface by inputting at least one part of said at least one projected image; a color transformation generator for generating color transformation providing color appearance matching based on i) at least one of a color space derived from the color information of an input image and a predetermined color space, and ii color space derived from the color information of the at least one projected image, and a color transformation section for transforming color of the input image according to the color transformation to produce a corrected-color image to be outputted to the projector.

A color correction device according to the other aspect of the present invention includes: a color information generator for generating color information of at least one projected image on a projection surface by inputting at least one part of said at least one projected image; a color space generator for generating a color space on the projection surface from the color information of said at least one projected image; a color transformation generator for generating color transformation providing color appearance matching based on an input-side color space and the color space on the projection surface; and a color transformation section for transforming color of the input image according to the color transformation to produce a corrected-color image to be outputted to the projector.

Further, gamma correction data may be generated by projecting at least one gamma-correction measurement image on the projection surface, and gamma correction of the corrected-color image may be performed according to the gamma correction data to produce a gamma-corrected image to be outputted to the projector.

Furthermore, the color transformation is preferably updated in one of cases where a present time coincides with periodically predetermined times, where a user's instruction occurs, and where the projected image on the projection surface is refreshed.

In the case where the input image is sequence image, a update timing signal may be generated when a cut point is detected from the input image which is sequence image. The color transformation may be updated when the update timing signal is generated.

BRIEF DESCRIPTION OF THE DRAWINGS

FIG. 8 is a block diagram showing a projector system including a projector color correction device according to a fifth embodiment of the present invention.

DESCRIPTION OF THE PREFERRED EMBODIMENTS

Figure 1:
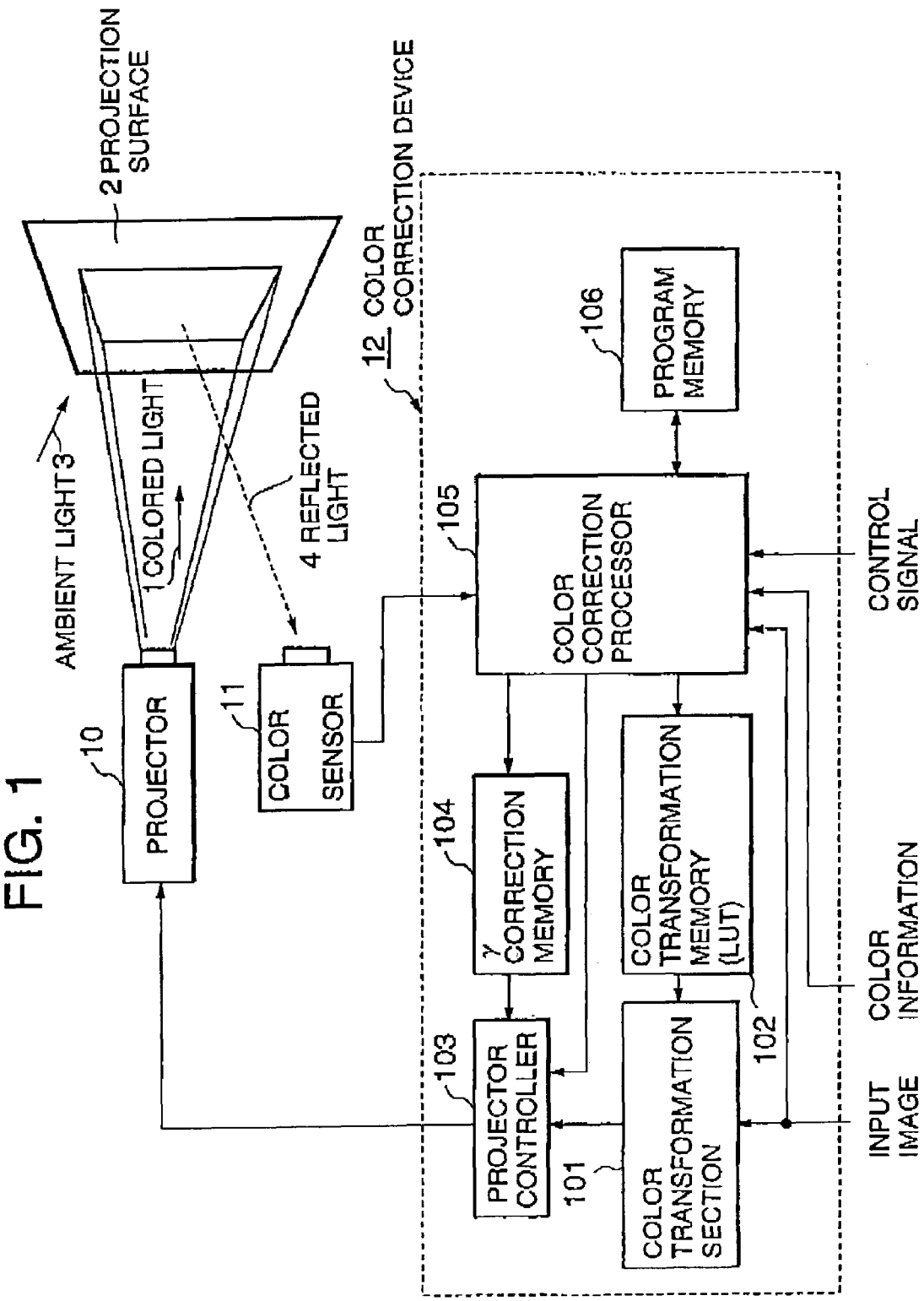
FIG. 1 is a block diagram showing a projector system including a projector color correction device according to the present invention.

Referring to FIG. 1, a projector 10 emits colored light 1 to a projection surface 2 and the human visual system senses light from the projection surface 2 to recognize colors of a projected image on the projection surface 2. In the description, "projection surface" means a surface to which the projector 10 projects an image, such as a screen or the surface of a wall. Actually, ambient light 3 exists in the surrounding environment of the projection surface 2. Accordingly, the color of a projected image on the projection surface 2 is determined from a reflected light 4 composed of three color components: the colored light 1 emitted by the projector 10; the color of the projection surface 2; and the ambient light 3. The reflected light 4 reflected off the projection surface 2 is represented by the following formula (1):

$$C_r(\lambda) = (C_p(\lambda) + E(\lambda)) \times R(\lambda) \qquad (1),$$

where $C_r(\lambda)$ is the spectral power distribution of the reflected light 4, $C_p(\lambda)$ is the spectral power distribution of the colored light 1, $E(\lambda)$ is the spectral power distribution of the ambient light 3, $R(\lambda)$ is the surface reflectance, and $\lambda$ is the wavelength of light.

It is found from the equation (1) that the color reproduction of the projector 10 should be performed taking into account not only the colored light 1 emitted by the projector 10 but also the environmental conditions such as the color of the projection surface 2 and the ambient light 3. In the case of reproduction of an input image that has been produced so that the accurate colors of the image can be reproduced under a predetermined environmental condition, the environmental condition of the projector 10 is not always the same as the predetermined environmental condition. Even if the projector 10 operates under such a different environmental condition, a projector color correction device according to the present invention can reproduce the accurate colors of the input image stably.

As shown in FIG. 1, the projector system includes the projector 10 for emitting the colored light 1, the projection surface 2 on which a color image is projected, a color sensor 11 for inputting the reflected light 4 to output a sensed color signal, and the color correction device 12 according to the present invention. The color correction device 12 receives input image data and other necessary data from a personal computer or the like (not shown).

The color correction device 12 first controls the projector 10 and the color sensor 11 such that the reference-color light is projected onto the projection surface 2 and the reflected light 4 is captured by the color sensor 11. Based on the sensed color signal of the color sensor 11, the color correction device 12 corrects the color of an image to be projected onto the projection surface 2.

More specifically, a color transformation section 101 transforms the colors of an input image by referring to a color transformation lookup table (LUT) stored in a color transformation memory 102. A projector controller 103 controls the projector 10 depending on the color-transformed image data received from the color transformation section 101. The projector controller 103, if necessary, performs gamma correction of the color-transformed image data by referring to a gamma-correction LUT stored in a gamma-correction memory 104. In this manner, the color-transformed image data, if necessary, subjected to gamma-correction, is used to drive the projector 10 to project on the projection surface 2 an image having the same color appearance as the input image.

A color correction processor 105 generates the color-transformation LUT used for color correction of the input image based on the sensed color signal of the color sensor 11 and stores the color-transformation LUT into the color transformation memory 102. The color-transformation LUT is generated when the projector 10 starts up or depending on a user's instruction. The color-transformation LUT may be updated when the image is refreshed or at regular time intervals. Further, when sequence image is inputted, the color-transformation LUT may be updated each time a cut point or scene change of the sequence image is detected. The color correction processor 105 may also updates the color-transformation LUT stored in the gamma-correction memory 104 to control the projector controller 103. The details of these operations will be described later.

The color correction processor 10b inputs a control signal from the personal computer or the like. Accordingly, a user's operation of an input device of the personal computer or the like allows parameter adjustment of the color transformation LUT or the updating of the color transformation LUT, which will be also described later.

The color correction processor 105 can be realized by hardware and alternatively it may be implemented by running a color correction program as describe later on a program-controlled processor. The color correction program and other necessary programs are stored in a program memory 106. The color transformation section 101 may be similarly implemented on a program-controlled processor.

Figure 2:
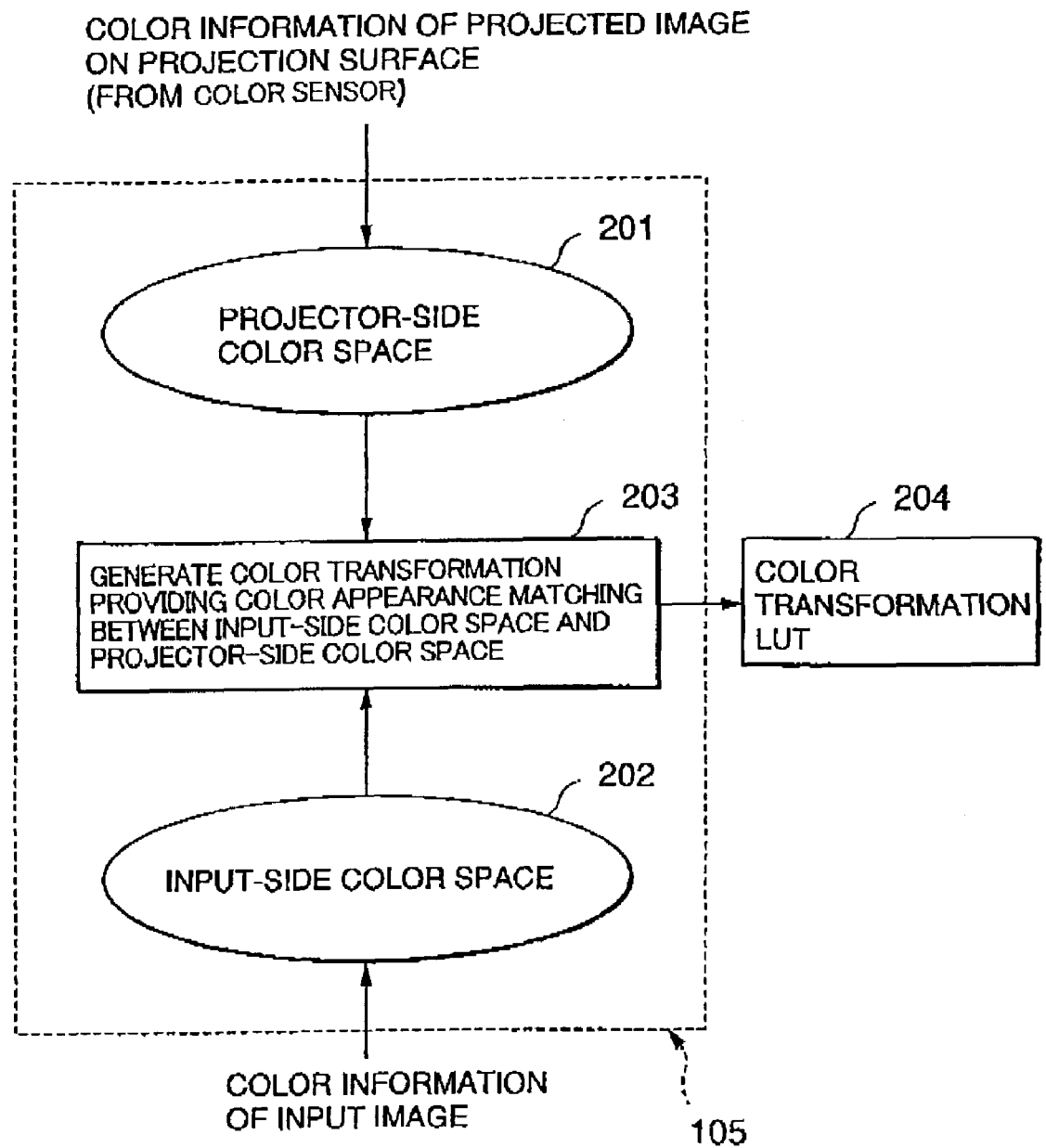
FIG. 2 is a schematic diagram showing an outline of color correction according to the present invention, which is performed by a color correction processor 105 as shown in FIG. 1.

Referring to FIG. 2, the color correction processor 105 performs a color-transformation generating process 203 to generate the color transformation LUT 204 providing color-appearance matching based on a projector-side (output-side) color space 201 and an input-side color space 202. As to the input-side color space 202, in the case where the color information of the input image cannot be obtained, a previously estimated color space may be used.

Figure 3:
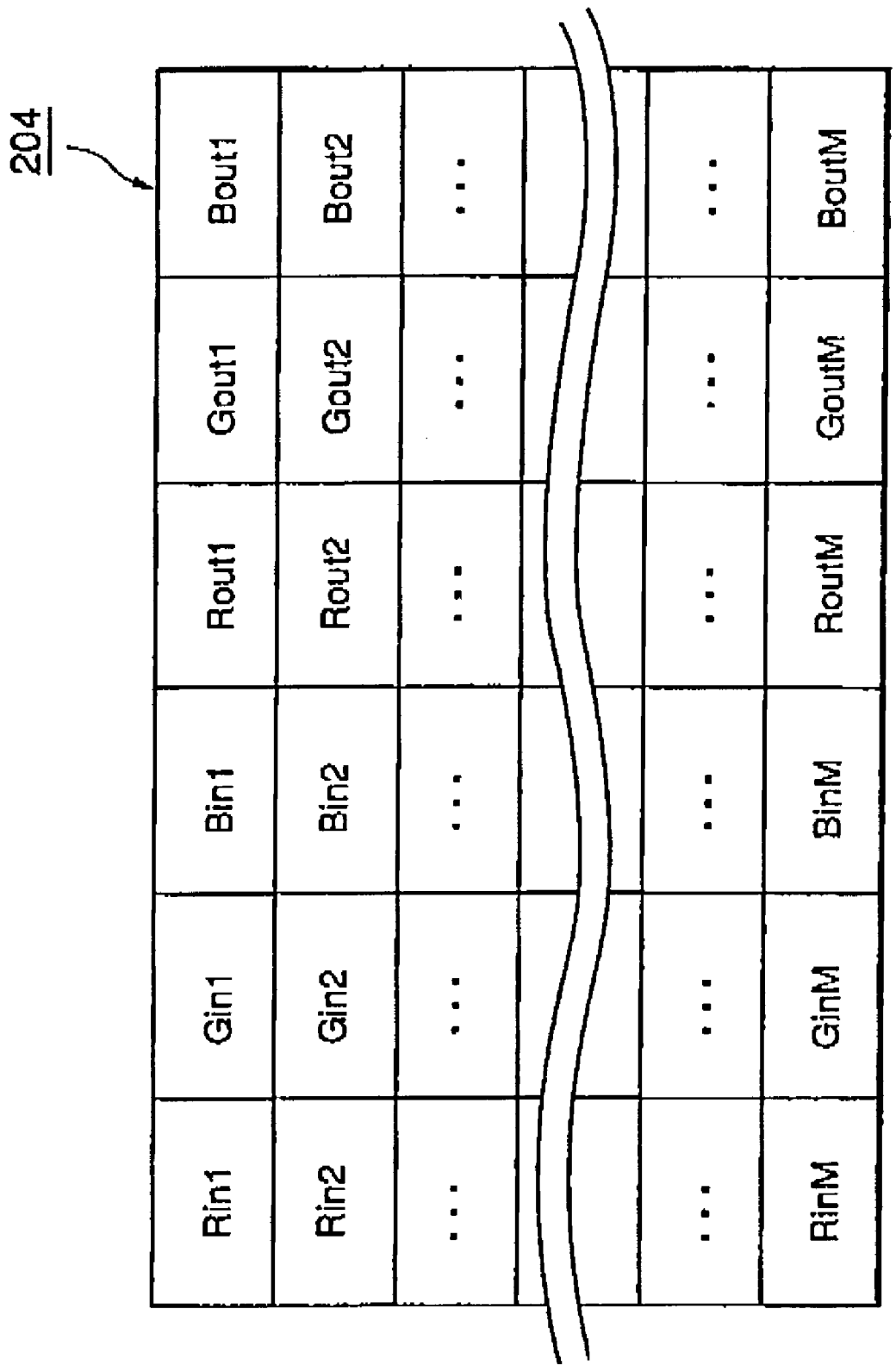
FIG. 3 is a diagram showing an example of contents of a color transformation LUT.

Referring to FIG. 3, the color transformation LUT contains input-side device-dependent color ($R_{in}$, $G_{in}$, $B_{in}$) of each of M representative colors and projector-side device-dependent color ($R_{out}$, $G_{out}$, $B_{out}$) of a corresponding color. The color transformation section 101 inputs the input-side device-dependent color ($R_{in}$, $G_{in}$, $B_{in}$), reads out the projector-side device-dependent color ($R_{out}$, $G_{out}$, $B_{out}$) corresponding to the input-side device-dependent color by referring to the color transformation memory 102, and outputs it to the projector controller 103.

When having received a color other than the representative colors, the color transformation section 101 uses the color transformation LUT to calculate its corresponding color by interpolation. For example, a hexahedron is generated from the representative colors of the color transformation LUT including the input color and the corresponding color can be readily calculated by using interpolation. In the case of the projector 10 of four or more primary colors, the color transformation using the color transformation LUT can be readily achieved by enhancing the interpolation method.

There have been proposed various color transformation methods of transforming an arbitrary color on the input-side color space 202 to a corresponding color on the projector-side color space 204 with keeping the color appearance thereof. For example, a color matching method (Japanese Patent No. 3072729 owned by the present applicant), chromatic adaptation models including von Kries model, and color appearance models (CIELAB, CIECAM97s, and Nayatani 97 model) may be employed.

Hereinafter, a color correction method employing the color matching method (Japanese Patent No. 3072729) will be described as an example. This color matching method has an advantage such that a more accurate color matching can be achieved by adjusting transformation parameter and setting an ambient status to dark, dim, or normal light, and designating its visual environmental information. Moreover, it is possible for a user to select one of a plurality of color transformation methods including the color matching method. These will be described in detail later.

1. First Embodiment

Figure 4:
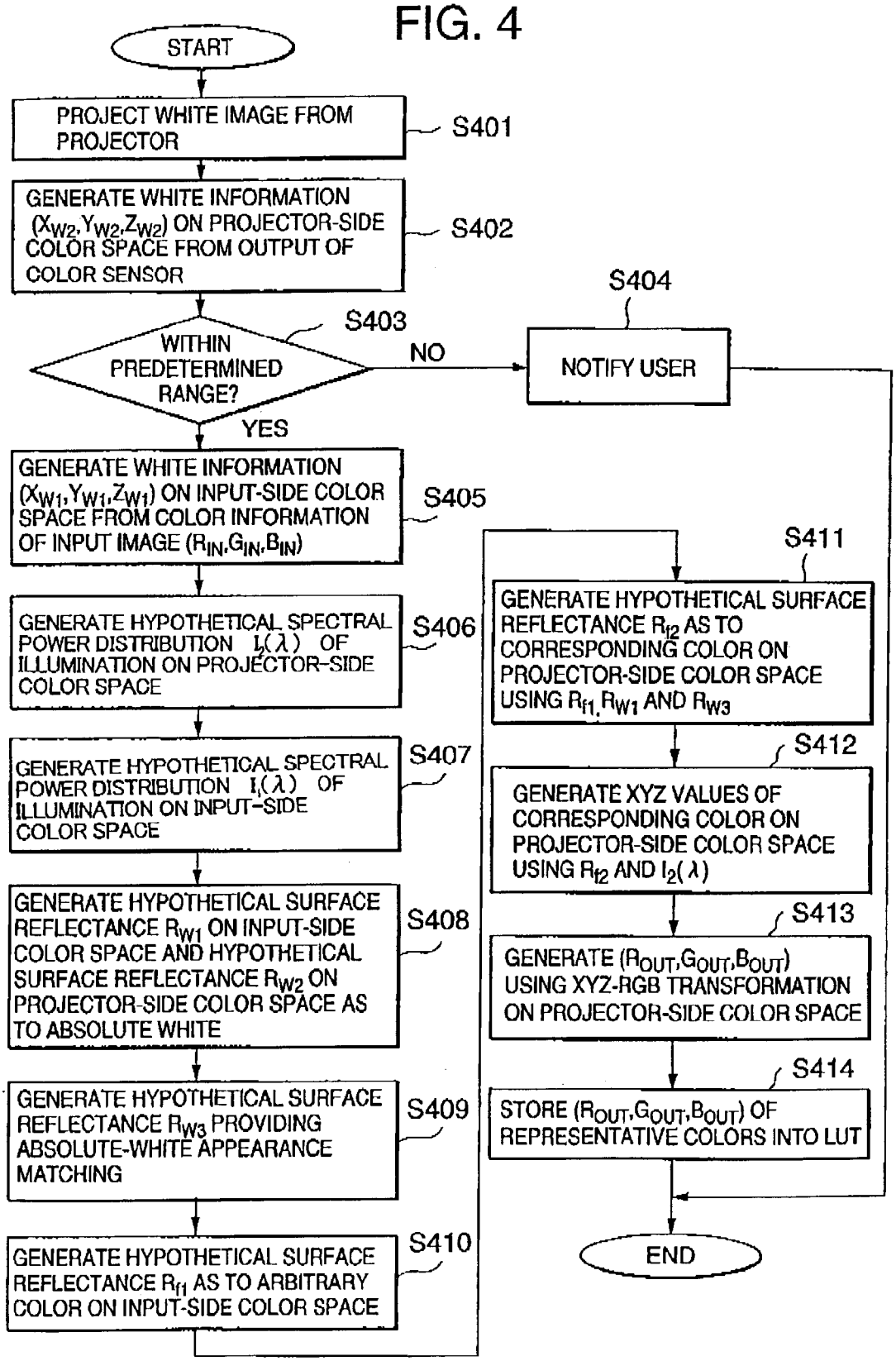
FIG. 4 is a flowchart showing a first embodiment of a color correction method according to the present invention.

Referring to FIG. 4, the steps S401-S402 are the processing related to the projector-side color space, the step S405 is the processing related to the input-side color space, and the steps S406-S414 are the processing related to color transformation providing color appearance matching.

Projector-side Color Space Processing

First, to obtain projector-side white information, the color correction processor 105 instructs the projector controller 103 to project the reference white light 1 is projected onto the projection surface 2 (step S401). Subsequently, the color sensor 11 having a known color characteristic captures the reflected light 4 from the projection surface 2. Based on the sensed color signal of the color sensor 11, the color correction processor 105 obtains a projector-side color signal, which is a RGB signal or the like, for example.

Since the color characteristic of the color sensor 11 has been known, the device-dependent color signal that is the output of the color sensor 11 can be converted to a device-independent color signal (tristimulus values XYZ or the like). In this embodiment, it is assumed that the white balance function and gamma correction function, which are in general incorporated in a color sensor, are fixed to a certain setting condition. Accordingly, the color sensor 11 has a fixed color characteristic set by fixing its setting condition.

In the case of the color sensor 11 having the gamma correction fixed to 1.0, linear transformation such as represented by the following formula (2) can be used to transform the device-dependent color signal RGB of the color sensor 11 to the device-independent XYZ values.

$$\begin{bmatrix} X \\ Y \\ Z \end{bmatrix} = M \begin{bmatrix} R \\ G \\ B \end{bmatrix} + \begin{bmatrix} \alpha \\ \beta \\ \gamma \end{bmatrix} \quad (2)$$

In the above formula (2), M is a 3×3 RGB→XYZ transformation matrix, which indicates the color characteristic of the color sensor 11, and ($\alpha$, $\beta$, $\gamma$) is a correction term for black offset or the like. M and ($\alpha$, $\beta$, $\gamma$) are obtained by determining M so as to minimize a color difference Fab in CIELAB color space or the like according to the method of least squares when inputting a set of color signals RGB obtained by capturing a color patch composed of a plurality of colors and a set of tristimulus values XYZ of the color patch, which is obtained by using a spectrophotometer or the like when capturing the color patch.

The transformation from device-dependent RGB of the color sensor 11 to device-independent XYZ is not limited to the linear transformation taking into account only singledimensional colors such as represented by the formula (2). A 3×n RGB→XYZ transformation matrix (n is an integer equal to or greater than 4) may be employed, which also takes into account multi-dimensional colors such as RG, GB, RGB and so on. Further, representative RGB values and corresponding XYZ values are stored in a lookup table (LUT), which is used to calculate XYZ values corresponding to a color other than the representative colors by interpolation. The color sensor 11 may directly output device-independent tristimulus values XYZ.

The tristimulus values XYZ corresponding to the white signal obtained thus is assumed to be $(X_{W2}, Y_{W2}, Z_{W2})$, which is used as white information on the projector side (step S402). In the case of the projector 10 having four or more primary colors, the similar method can be used to represent the correspondence between device-independent color and device-dependent color in a linear form as shown in the formula (2).

Subsequently, it is determined whether the obtained values of white information $(X_{W2}, Y_{W2}, Z_{W2})$ on the projector side fall within a predetermined range (step S403). If it falls out of the predetermined range (NO in step S403), then the user is notified (step S404) and the processing is terminated.

It the obtained values of white information $(X_{W2}, Y_{W2}, Z_{W2})$ fall within a predetermined range (YES in step S403), then the input-side color space processing (step S405) is performed.

Input-side Color Space Processing

The color correction processor 105 obtains the correspondence between an input-side device-dependent color and a corresponding device-independent color from color information or the like preset in the input image. For example, in the case where RGB of the input image are provided as a standard color space of sRGB (IEC61966-2-1) prescribed by International Electrotechnical Commission (IEC), the while is preset when illuminated with D65 and the correspondence between RGB and XYZ is prescribed. In the case where ICC profile prescribed by International Color Consortium (see Web site: http://www.color.org) has been provided, the detailed color information of the input image can be obtained from the ICC profile.

For example, when RGB of the input image is sRGB, the transformation described in IEC61966-2-1 can be used to transform the input image RGB to tristimulus values XYZ. Taking into account the case where the color information of an image to be displayed by the projector is not obtained, hypothetical reference color information of an image is prepared and can be used for the color transformation.

The tristimulus values XYZ obtained thus is assumed to be $(X_{W1}, Y_{W1}, Z_{W1})$, which is used as white information on the input side (step S405).

Color Transformation

When the white information $(X_{W1}, Y_{W1}, Z_{W1})$ on the input-side color space and the white information $(X_{W2}, Y_{W2}, Z_{W2})$ on the projector-side color space have been calculated, an actual color transformation is constructed. The actual color transformation allows an arbitrary color on the input-side color space to be transformed to a corresponding color on the projector-side color space with maintaining the color appearance. Here, the color matching method disclosed in Japanese Patent No. 3072729 is basically used to construct the color transformation.

1) Hypothetical Spectral Power Distribution

First of all, chromaticity xy is calculated from white tristimulus values $(X_{W1}, Y_{W1}, Z_{W1})$ on the input-side color space. The hypothetical spectral power distribution $I_1(\lambda)$ of illumination on the input-side color space is obtained from the calculated chromaticity xy. Similarly, chromaticity is calculated from white tristimulus values $(X_{W2}, Y_{W2}, Z_{W2})$ on the projector-side color space. The hypothetical spectral power distribution $I_2(\lambda)$ of illumination on the projector-side color space is obtained from the calculated chromaticity (steps S406 and S407). Here, it is possible to obtain the hypothetical spectral power distribution of illumination from white tristimulus values by the introduction of assumption that the color of the projection surface 2 is the absolute white. When the chromaticity of these whites falls out of a chromaticity range determined by the range of a correlated color temperature assumed with CIE daylight, the user is notified.

2) Hypothetical Surface Reflectance of Absolute White

Next, it thinks about arbitrary color A of the input-side color space. Tristimulus values XYZ for RGB of color A are calculated by the steps similar to the case of white. A set of tristimulus values of the color A is assumed to be $(X_1, Y_1, Z_1)$. Hypothetical surface reflectance $R_1(\lambda)$ of the color A in the input-side color space is calculated by using tristimulus values $(X_1, Y_1, Z_1)$ of the color A and the hypothetical spectral power distribution $I_1(\lambda)$ of the illumination. The relation between the tristimulus values $(X_1, Y_1, Z_1)$ and the hypothetical surface reflectance $R_1(\lambda)$ of the color A is represented by the following formulae (3)-(5).

$$\left.\begin{aligned} X_1 &= k_1 \int I_1(\lambda) R_1(\lambda) \bar{x}(\lambda) d\lambda \\ Y_1 &= k_1 \int I_1(\lambda) R_1(\lambda) \bar{y}(\lambda) d\lambda \\ Z_1 &= k_1 \int I_1(\lambda) R_1(\lambda) \bar{z}(\lambda) d\lambda \end{aligned}\right\} \qquad (3)$$

In the formula (3), $k_1$ is an integral constant represented by the following formula (4), and $\bar{x}, \bar{y}, \bar{z}$ are known color matching functions.

$$k_1 = \frac{100}{\int I_1(\lambda) \bar{y}(\lambda) d\lambda} \qquad (4)$$

With the assumption that a surface reflectance can be approximated by the weighted sum of basis vectors, the hypothetical surface reflectance $R_1(\lambda)$ is represented by the following finite dimensional linear model.

$$R_1(\lambda) = r_0(\lambda) + a_1 r_1(\lambda) + a_2 r_2(\lambda) + a_3 r_3(\lambda) \qquad (5)$$

where $r_i(\lambda)$ (i=0, 1, 2, 3) is a basis vector obtained by the principal component analysis of surface reflectance collected from many objects, $r_0(\lambda)$ is an average, $r_1(\lambda)$ is a primary principal component vector, $r_2(\lambda)$ is a secondary principal component vector, and $r_3(\lambda)$ is a third principal component vector, which are all known. The $a_i$ (i=0, 1, 2, 3) is a weighting coefficient of each basis vector, which is an unknown parameter representing the color of an object.

Substitution of the formula (5) into the formula (3) yields the following formula (6) indicating the observation equation of the unknown parameter $a_i$, which can be calculated.

$$\begin{bmatrix} a_1 \\ a_2 \\ a_3 \end{bmatrix} = \begin{bmatrix} M(x, r_1) & M(x, r_2) & M(x, r_3) \\ M(y, r_1) & M(y, r_2) & M(y, r_3) \\ M(z, r_1) & M(z, r_2) & M(z, r_3) \end{bmatrix}^{-1} \begin{bmatrix} X_1 - M(x, r_0) \\ Y_1 - M(y, r_0) \\ Z_1 - M(z, r_0) \end{bmatrix} \qquad (6)$$

In the formula (6), $M(x, r_i)$ (i=0, 1, 2, 3) is an integral term: $k \int I_1(\lambda) r_i(\lambda) \bar{x}(\lambda) d\lambda$. It is the same with y and z.

Substitution of $a_i$ (i=0-3) obtained by the formula (6) into the formula (5) yields the hypothetical surface reflectance $R_1(\lambda)$ of the color A on the input-side color space.

When the absolute white on the input-side color space is given, the tristimulus values of the absolute white are equal to the white tristimulus values $(X_{W1}, Y_{W1}, Z_{W1})$. Accordingly, hypothetical surface reflectance $R_{W1}(\lambda)$ of the absolute white on the input-side color space can be calculated by the above-described calculation using the hypothetical spectral power distribution $I_1(\lambda)$ and the tristimulus values $(X_{W1}, Y_{W1}, Z_{W1})$ of the absolute white (step S408).

Subsequently, it is considered that the tristimulus values $(X_{W1}, Y_{W1}, Z_{W1})$ of the absolute white on the input-side color space are reproduced on the projector-side color space with the quite same tristimulus values. In this case, hypothetical surface reflectance $R_{w2}(\lambda)$ of the absolute white on the projector-side color space can be calculated by the above-described calculation using the hypothetical spectral power distribution $I_2(\lambda)$ of the illumination on the projector-side color space and the tristimulus values $(X_{W1}, Y_{W1}, Z_{W1})$ of the absolute while on the input-side color space (step S408).

When the hypothetical surface reflectances $R_{w1}(\lambda)$ and $R_{w2}(\lambda)$ of the absolute white have been calculated as described above, the hypothetical surface reflectance $R_{w3}(\lambda)$ providing the color appearance matching of the absolute white on the two color spaces can be calculated using $R_{w1}(\lambda)$ and $R_{w2}(\lambda)$ in accordance with the following formula (7):

$$R_{W3}(\lambda) = c \times R_{W1}(\lambda) + (1-c) \times R_{W2}(\lambda) \qquad (7),$$

where c is an incomplete chromatic adaptation coefficient, which is a real number ranging from 0 to 1.0. As described later, the incomplete chromatic adaptation coefficient c can be adjusted as an adjustment parameter by a user.

3) Hypothetical Surface Reflectance of Color Other than White

Next, the case of arbitrary color other than white will be described. First, the hypothetical surface reflectance $R_{f1}(\lambda)$ of an arbitrary color $(X_1, Y_1, Z_1)$ on the input-side color space is calculated by the same calculation as in the case of the white (step S410). Thereafter, the hypothetical surface reflectance $R_{f2}(\lambda)$ of a corresponding color on the projector-side color space is calculated in accordance with the following formula (8):

$$R_{f2}(\lambda) = R_{f1}(\lambda) \times cc(\lambda) \qquad (8),$$

where $cc(\lambda)$ is a surface reflectance adaptation coefficient that is a chromatic adaptation ratio for each wavelength in a visible range of wavelengths, which is calculated by the following formula (9):

$$cc(\lambda) = R_{w3}(\lambda) / R_{w1}(\lambda) \qquad (9)$$

4) Corresponding Color XYZ on Projector-side Color Space

The tristimulus values $(X_2, Y_2, Z_2)$ of a color on the projector-side color space, corresponding to an arbitrary input color on the input-side color space, are calculated by the following formula (10) (step S412):

$$\left. \begin{aligned} X_2 &= k_2 \int I_2(\lambda) R_{f2}(\lambda) \bar{x}(\lambda) d\lambda \\ Y_2 &= k_2 \int I_2(\lambda) R_{f2}(\lambda) \bar{y}(\lambda) d\lambda \\ Z_2 &= k_2 \int I_2(\lambda) R_{f2}(\lambda) \bar{z}(\lambda) d\lambda \end{aligned} \right\} \qquad (10)$$

In the formula (10), $k_2$ is an integral constant represented by the following formula (11):

$$k_2 = \frac{100}{\int I_2(\lambda) \bar{y}(\lambda) d\lambda}. \qquad (11)$$

The tristimulus values $(X_2, Y_2, Z_2)$ of a corresponding color on the projector-side color space can be transformed to the device(projector 10)-dependent color $R_2G_2B_2$ in according with, for example, the following formula (12):

$$\begin{bmatrix} R_2 \\ G_2 \\ B_2 \end{bmatrix} = O \begin{bmatrix} X_2 \\ Y_2 \\ Z_2 \end{bmatrix} + \begin{bmatrix} l \\ m \\ n \end{bmatrix}, \qquad (12)$$

where O is the color characteristic of the projector 10, which is the transformation matrix for device-independent color tristimulus values XYZ to device-dependent color RGB transformation matrix, and (l, m, n) is a correction term for black offset (step S413).

The $R_2G_2B_2$ obtained by the formula (12) are stored as a set of $(R_{out}, G_{out}, D_{out})$ into the color transformation LUT (step S414).

The $(R_{out}, G_{out}, B_{out})$ obtained by the formula (12) are RGB values in the state that the gamma is set to 1.0. Accordingly, when the projector 10 has a certain gamma characteristic, the projector controller 103 performs gamma correction on the $(R_{out}, G_{out}, B_{out})$.

In the case of the projector 10 having four or more primary colors, the similar method can be used to represent the correspondence between device-independent color and device-dependent color in a linear form as shown in the formula (12).

2. Second Embodiment

Figure 5:
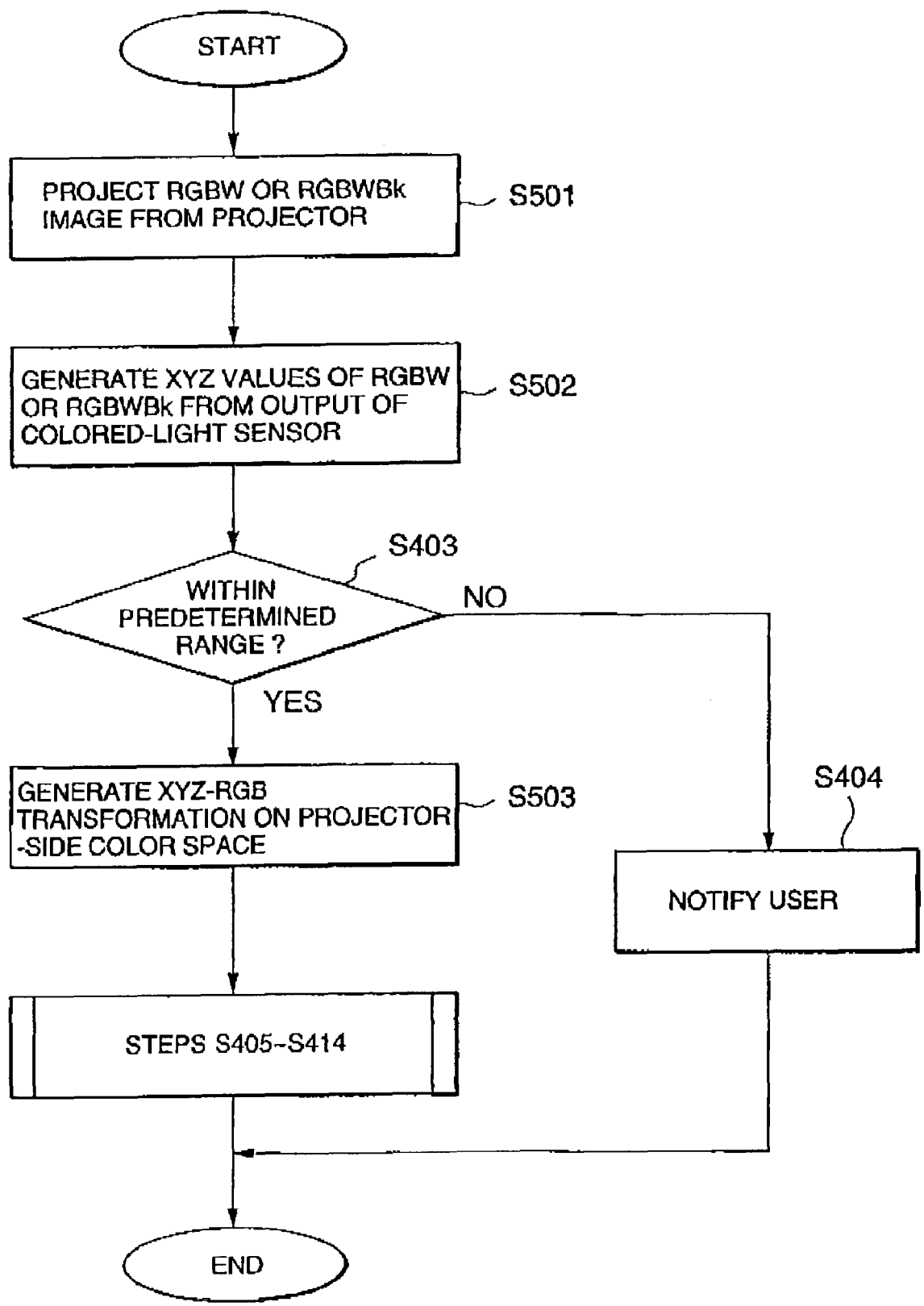
FIG. 5 is a flowchart showing a second embodiment of a color correction method according to the present invention.

FIG. 5 shows a color correction method according to a second embodiment of the present invention, where the steps S403-S414 are the same as those of FIG. 4 and therefore the descriptions are omitted.

Even if the projector 10 is previously provided with standard color characteristic as represented by the formula (12), it is desirable to update the color characteristic of the projector 10 taking into account influences of the color of the projection surface 2 and the ambient light 3 so as to achieve highly accurate color reproduction by the projector 10. According to the second embodiment, the color characteristic of the projector 10 is determined by actual measurement.

As shown in FIG. 5, to obtain projector-side white information and the color characteristic of the projector 10, the projector controller 103 projects an image or images composed of R(red), G(green), B(blue) and W(white) or composed of R, G, B, W, and Bk (black), onto the projection surface 2 under the control of the color correction processor 105 (step S501).

Subsequently, the color sensor 11 captures the reflected light 4 from the projection surface 2. Based on the sensed color signal of the color sensor 11, the color correction processor 105 produces tristimulus values XYZ corresponding to each of RGBW or RGBWBK using the formula (2) (step S502). The tristimulus XYZ of the white (W) obtained thus are assumed to be $(X_{W2}, Y_{W2}, Z_{W2})$.

Subsequently, it is determined whether the obtained values of white information ($X_{W2}$, $Y_{W2}$, $Z_{W2}$) on the projector side fall within a predetermined range (step S403). If the obtained values of white information ($X_{W2}$, $Y_{W2}$, $Z_{W2}$) fall within a predetermined range (YES in step S403), then the XYZ→RGB transformation matrix as represented by the formula (12) is generated (step S503).

The XYZ→RGB transformation as represented by the formula (12) can be obtained by using the chromaticity of each color calculated from the tristimulus values XYZ of each of RGBW (see Tajima "Color Image Copying—Foundations of Color Management", Maruzen, 1996, Chapter 3 "Color Reproduction of Display"). By using the tristimulus values XYZ of each of RCBW and Bk, the black shift (l, m, n) can be more accurately obtained.

When the XYZ→RGB transformation has been obtained as described above, the steps S405-S414 of FIG. 4 are performed to construct the color transformation. In the step S413, the obtained XYZ→RGB transformation is used. Since the XYZ→RGB transformation is determined based on the actual measurement, the highly accurate color reproduction taking into account the environmental conditions of the projector 10 can be achieved.

In addition, the projector 10 may project an image or images having multilevel gray scale on the projection surface 2 so as to measure the gamma characteristic of the projector 10. The color correction processor 105 can measure the gamma characteristic from the color information of the projected grayscale, which is used to update the data of the gamma correction memory 104.

3. Third Embodiment

Figure 6:
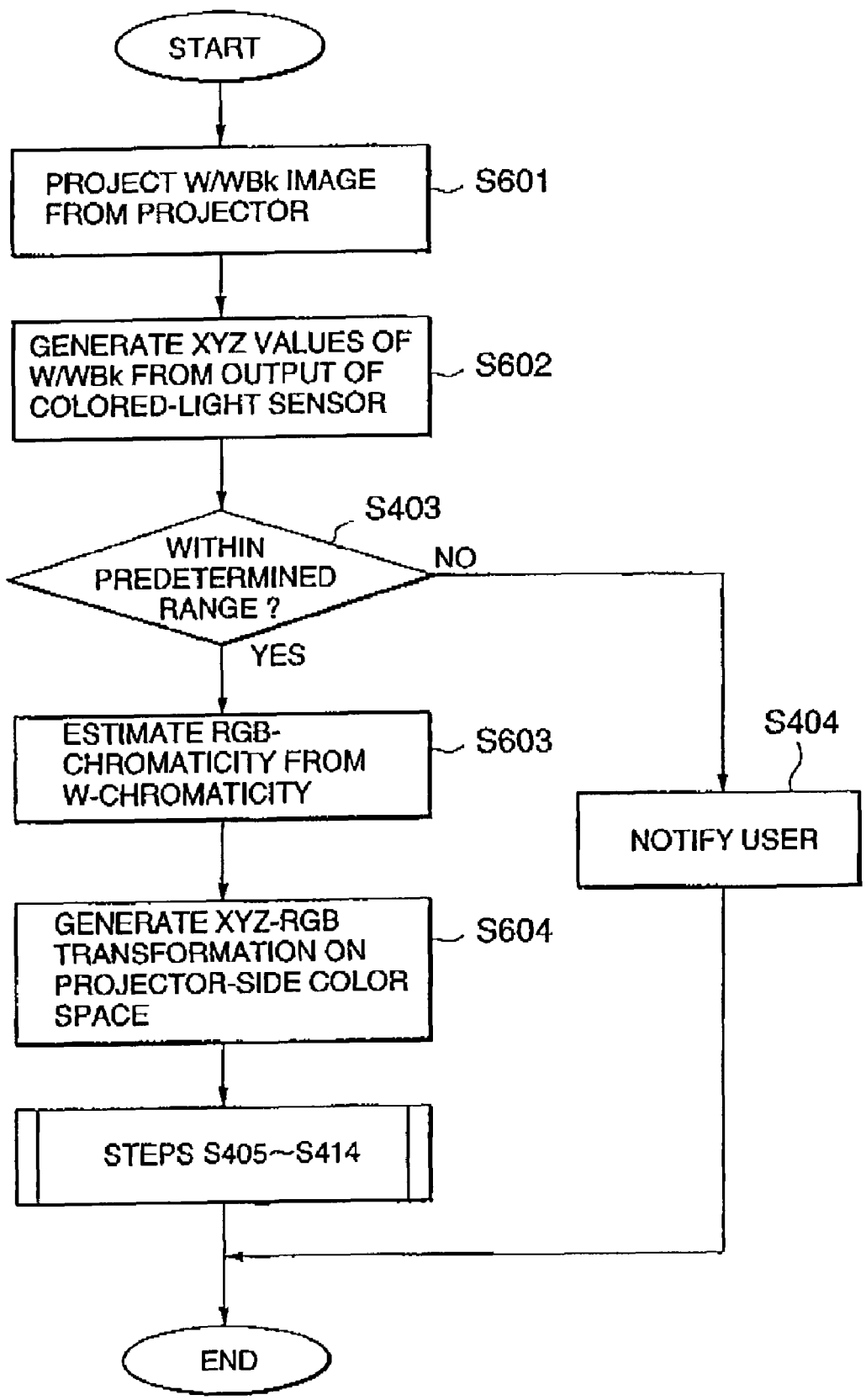
FIG. 6 is a flowchart showing a third embodiment of a color correction method according to the present invention.

FIG. 6 shows a color correction method according to a third embodiment of the present invention, where the steps S403-S414 are the same as those of FIG. 4 and therefore the descriptions are omitted.

According to the third embodiment, the color characteristic of the projector 10 as represented by the formula (12) is determined by estimating RGB color information on the projection surface from the white-color information of the projected image.

As shown in FIG. 6, to obtain projector-side white information and the color characteristic of the projector 10, the projector controller 103 projects an image or images composed of W(white) or composed of W and Bk (black), onto the projection surface 2 under the control of the color correction processor 105 (step S601).

Subsequently, the color sensor 11 captures the reflected light 4 from the projection surface 2. Based on the sensed color signal of the color sensor 11, the color correction processor 105 produces tristimulus values XYZ corresponding to W or WBk using the formula (2) (step S602). The tristimulus values XYZ of the white (W) obtained thus are assumed to be ($X_{W2}$, $Y_{W2}$, $Z_{W2}$).

Subsequently, it is determined whether the obtained values of white information ($X_{W2}$, $Y_{W2}$, $Z_{W2}$) on the projector side fall within a predetermined range (step S403). If the obtained values of white information ($X_{W2}$, $Y_{W2}$, $Z_{W2}$) fall within a predetermined range (YES in step S403), then RGB chromaticity is estimated from the chromaticity (wx, wy) of the white (step S603). For example, the chromaticity (bx, by) of the blue can be estimated using multiple regression analysis by the following formulae:

$$bx = a_1 wx + a_2 wy + a_0 \quad (13)$$

$$by = b_1 wx + b_2 wy + b_0 \quad (14)$$

In these formulae, the coefficient $a_i$ can be calculated using a variance-covariance matrix of the chromaticity x and y of the W, a covariance $S_{1y}$ between the chromaticity x of the B and the chromaticity x of the W, and a covariance $S_{2y}$ between the chromaticity x of the B and the chromaticity y of the W, in accordance with the following formula (15). The variance-covariance matrix of the chromaticity x and y of the white (W) is obtained as follows. First, a plurality of colors of the projection surface are prepared. The projector projects W and B images onto these surface colors. A spectrophotometer or the like is used to measure the chromaticity on the projection surface.

$$\begin{bmatrix} a_1 \\ a_2 \end{bmatrix} = \begin{bmatrix} S_1^2 & S_{12} \\ S_{12} & S_2^2 \end{bmatrix} \begin{bmatrix} S_{1y} \\ S_{2y} \end{bmatrix} \quad (15)$$

$$a_0 = \overline{bx} - (\overline{wx} \cdot a_1 + \overline{wy} \cdot a_2)$$

In the formula (15), $S_1^2$ is the variance of the chromaticity x of W, $S_2^2$ is the variance between the chromaticity y of W, $S_{12}$ is the covariance of the chromaticity x and y of W, $\overline{bx}$ is an average value of the chromaticity x of B, $\overline{wx}$ is an average value of the chromaticity x of W, and $\overline{wy}$ is an average value of the chromaticity y of W. It is the same with $b_i$. Similarly, the chromaticity of R and G can be estimated from the chromaticity y of W.

When the chromaticity of R, G, B, and W have been obtained, the XYZ→RGB transformation matrix 0 of the formula (12) can be easily calculated and therefore the XYZ→RGB transformation formula (12) can be generated (step S604). By using the tristimulus values XYZ of each of W and Bk, the black shift (l, m, n) of the formula (12) can be more accurately obtained.

When the XYZ→RGB transformation has been obtained as described above, the steps S405-S414 of FIG. 4 are performed to construct the color transformation. In the step S413, the obtained XYZ→RGB transformation is used. Since the XYZ→RGB transformation is determined based on the actual measurement, the highly accurate color reproduction taking into account the environmental conditions of the projector 10 can be achieved.

In addition, the projector 10 may project an image or images leaving multi-level gray scale on the projection surface 2 so as to measure the gamma characteristic of the projector 10. The color correction processor 105 can measure the gamma characteristic from the color information of the projected grayscale, which is used to update the data of the gamma correction memory 104.

4. Fourth Embodiment

As described before, there have been proposed various color transformation methods of transforming an arbitrary color on the input-side color space to a corresponding color on the projector-side color space with keeping the color appearance thereof. Not only the above-described color matching method but also other chromatic adaptation models including von Kries model or a color appearance models such as CIELAB, CIECAM97s, and Nayatani 97 model may be employed.

According to the fourth embodiment, the program memory 106 of the color correction device 12 as shown in FIG. 1 previously stores a plurality of color transformation algorithms, from which the user is allowed to select a desired one. More specifically, when the color correction setting is performed, a selection menu is displayed in a graphical user interface (GUI) to select one of a plurality of color transformation algorithms (models). The user clicks a desired model with a mouse (pointing device) connected to a personal computer or the like to select user-desired color correction.

Figure 7A:
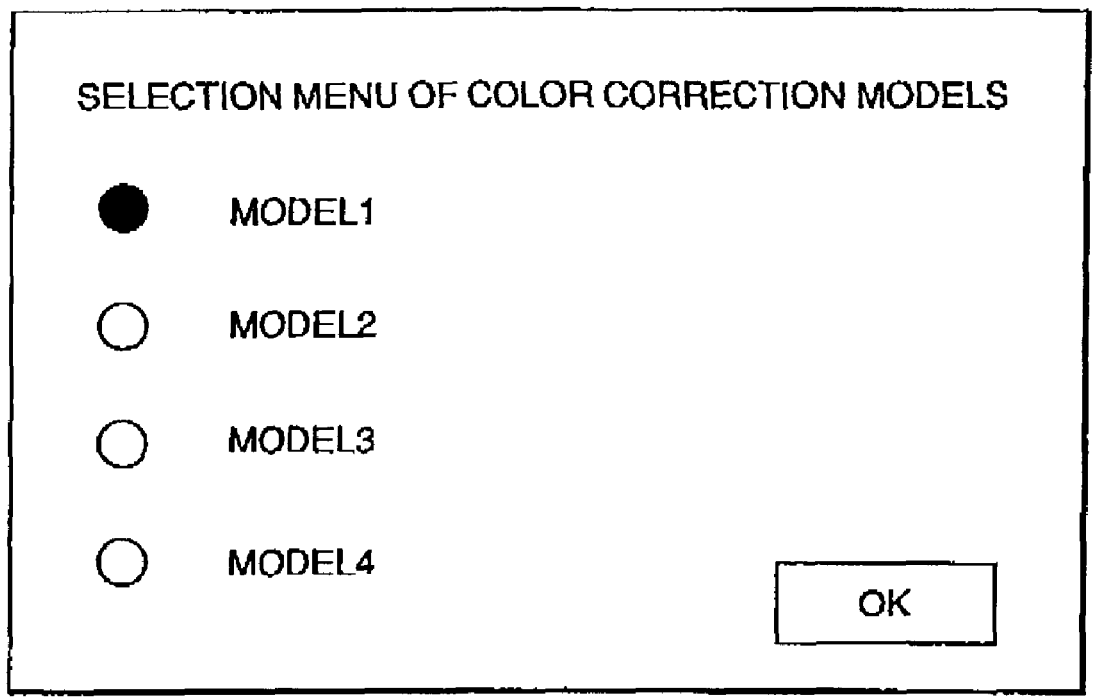
FIG. 7A is a diagram showing an example of a model selection GUI image displayed on the projection plane.

As shown in FIG. 7A, the color correction processor 105, when setting the color correction, displays the model selection GUI and waits for user's instruction. When the user selects Model-1 and then clicks OK button with the mouse or the like, the Model-1 is determined as a color transformation algorithm to be used.

Figure 7B:
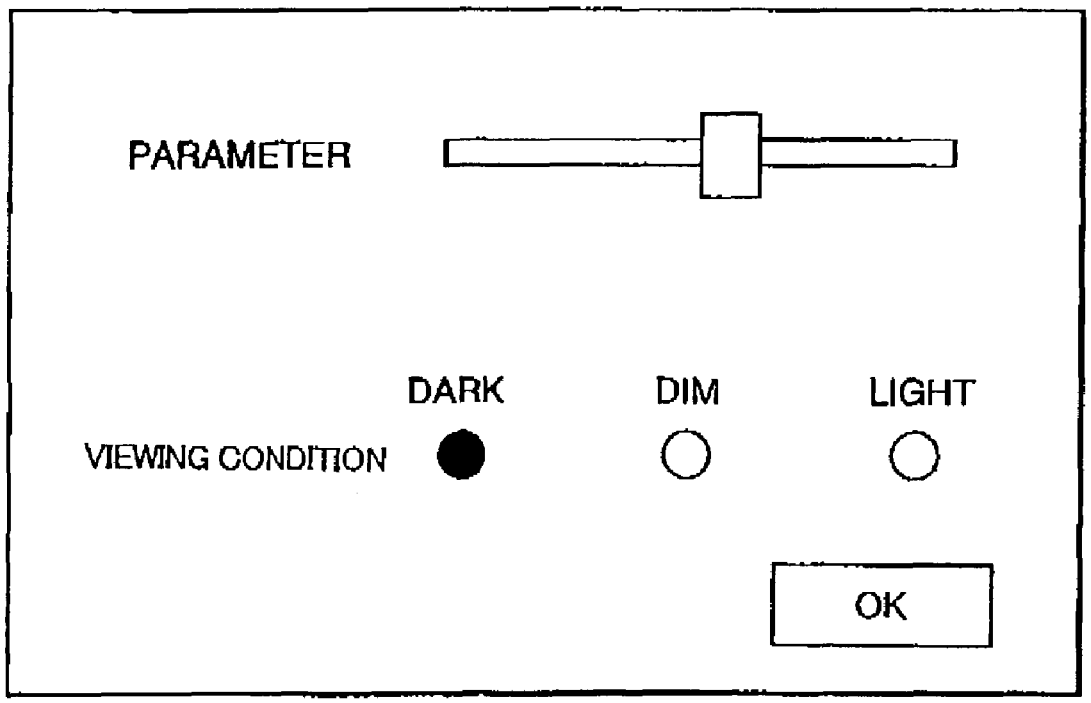
FIG. 7B is a diagram showing an example of a user-setting GUI image displayed on the projection plane.

In the case where the selected Model-1 allows a user to adjust parameters and designate environmental information, the color correction processor 105 displays a GUI for user setting as shown in FIG. 7B. As an example of parameter adjustment, the incomplete chromatic adaptation coefficient c of the formula (7) may be adjusted. When the parameter and the viewing condition are designated and the OK button is clicked, the setting of the selected color transformation algorithm is completed.

5. Fifth Embodiment

In the above first to fourth embodiments, the color transformation LUT of the color transformation memory 102 is normally generated when the projector starts up. However, in the case where the color reproduction of the projector 10 varies in time or depending on event occurrence, it is desirable to update the color transformation LUT periodically or at the timing of event occurrence, so that variations in color reproduction can be suppressed, resulting in a highly accurate color reproduction.

According to the fifth embodiment, the color transformation LUT is updated at the timing of event occurrence, such as when a user instruction occurs during image projection, when the projected image is refreshed due to user's clicking operation or the like, or when a cut point of sequence image being reproduced is detected. Here, the case of input image being sequence image will be described as an example.

In FIG. 8, blocks similar to those previously described with reference to FIG. 1 are denoted by the same reference numerals and the details will be omitted.

The color correction processor 105 generates a color transformation LUT and stores it onto the color transformation memory 102 when the projected image or a window is refreshed due to user's clicking operation of a mouse or the like of the personal computer, or when the user instructs color transformation. In addition, the color transformation LUT may be updated at regular time intervals.

As shown in FIG. 8, a color correction device 13 according to the fifth embodiment is further provided with a update timing generator 801. The update timing generator 801 monitors the input sequence image to detect a cut point and, when the cut point has been detected, outputs a update timing signal to the color correction processor 105. Upon receipt of the update timing signal, the color correction processor 105 generates the color transformation LUT and stores it onto the color transformation memory 102. On such updating of the color transformation LUT, the GUI as shown in FIG. 7 is not displayed.

An example of a cut-point detection method has been disclosed in Tajima et al., "Adaptive Quality Improvement Method for Video Sequence Using Scene Change Detection" Proceedings of IEICE System Society Conference 2001, D-11-88, p 173. More specifically, a similarity between frames of video sequence is calculated. A cut point is detected by comparing the calculated frame similarity and a predetermined threshold. In the case of sequence image, the color transformation is updated the moment when the cut point is detected, resulting in suppressed flicking caused by color transformation updating.

In order to permit the updating of the color transformation at any time, the projector 10 projects a white image onto a portion of the projection surface 2. In FIG. 8, the color sensor 11 captures the white portion at all times and outputs the captured image signal to the color correction processor 105, allowing the updating of tho color transformation LUT as described before.

In the systems as shown in FIGS. 1 and 8, a user views the reflected light 4 received from the projection surface 2. It is also possible to apply the present invention to the case where the user views transmitted light through the projection surface 2.

As described above, according to the present invention, color transformation allowing color appearance matching between different viewing conditions is provided with projector-side color space information that is obtained from color information on the projection surface projected by the projector, allowing the color appearance of an image projected by the projector to match a desired color appearance.

Further, the color space (the color characteristic of the projector) formed on the projection surface and/or gamma characteristic are measured and the measured characteristics are reflected in the color transformation, resulting in highly accurate color reproduction by the projector.

Furthermore, the color space on the projection surface is updated periodically or depending on event occurrence and thereby the color transformation is updated. Accordingly, the color reproduction by the projector is not affected by variations of color reproduction of the projector in time or depending on event occurrence, resulting in a highly accurate and stable color reproduction.

The invention claimed is:

1. A color correction method for a projector, comprising the steps of:
    a) projecting at least one image onto a projection screen;
    b) capturing color information of an image on the projection screen on which said at least one image is projected and creating from the color information a matrix representing an output color space of the projector on the projection screen;
    c) converting colors of an input image to tristimulus values based on an input color space associated with the input image and correcting the tristimulus values to compensate between incomplete human chromatic adaptation to the input color space and incomplete human chromatic adaptation to the output color space; and
    d) converting the corrected tristimulus values to colors of a corrected-color image to be projected based on the matrix.

2. The color correction method according to claim 1, wherein, in the step a), the image is white.

3. The color correction method according to claim 1, wherein the color conversion is implemented in a lookup table, wherein, in the step c), the lookup table is used to convert the color of the input image.

4. The color correction method according to claim 1, further comprising the step of updating the color conversion according to a predetermined condition.

5. The color correction method according to claim 1, further comprising the steps of:
    e) generating gamma correction data by projecting at least one gamma-correction measurement image on the projection screen; and f) performing gamma correction of the corrected-color image according to the gamma correction data to produce a gamma-corrected image to be outputted to the projector.

6. A color correction method for a projector, comprising the steps of:
   a) projecting at least one image onto a projection surface;
   b) capturing color information of an image on the projection surface which said at least one image is projected and creating from the color information a matrix representing an output color space of the projector on the projection surface;
   c) converting colors of the input image to tristimulus values based on an input color space associated with the input image and correcting the tristimulus values to compensate between incomplete human chromatic adaptation to the input color space and incomplete human chromatic adaptation to the output color space; and
   d) converting the corrected tristimulus values to colors of a corrected-color image to be projected based on the matrix.

7. The color correction method according to claim 6, wherein, in the step a), said at least one projected image includes primary colors of the projector and white.

8. The color correction method according to claim 6, wherein, in the step a), said at least one projected image includes primary colors of the projector, white, and black.

9. The color correction method according to claim 6, wherein
   in the step a), a white image is projected onto the projection surface, and
   in the step c), the color space on the projection surface is estimated from the color information of the white image.

10. The color correction method according to claim 6, wherein
    in the step a), at least one image including white and black is projected onto the projection surface, and
    in the step c), the color space on the projection surface is estimated from the color information of said at least one projected image including white and black.

11. The color correction method according to claim 6, wherein the color conversion is implemented in a lookup table, wherein, in the step c), the lookup table is used to convert the color of the input image.

12. The color correction method according to claim 6, further comprising the step of updating the color conversion according to a predetermined condition.

13. The color correction method according to claim 6, further comprising the steps of:
    f) generating gamma correction data by projecting at least one gamma-correction measurement image on the projection surface; and
    g) performing gamma correction of the corrected-color image according to the gamma correction data to produce a gamma-corrected image to be outputted to the projector.

14. A color correction method for a projector, comprising the steps of:
    detecting at least white information on a color space on a projection screen;
    creating a matrix representing the output color space on the projection screen;
    converting colors of an input image to tristimulus values based on an input color space associated with the input image and correcting the tristimulus values to compensate between incomplete human chromatic adaptation to the input color space and incomplete human chromatic adaptation to the output color space; and
    d) converting the corrected tristimulus values to colors of a corrected-color image to be projected based on the matrix.

15. A color correction device for a projector, comprising:
    a color information capturer for capturing color information of an image projected on a projection screen and creating from the color information a matrix representing an output color space of the projector on the projection screen;
    a color converter for converting colors of an input image to tristimulus values based on an input color space associated with the input image and correcting the tristimulus values to compensate between incomplete human chromatic adaptation to the input color space and incomplete human chromatic adaptation to the output color space; and
    a tristimulus value converter for converting the corrected tristimulus values to colors of a corrected-color image to be project ed based on the matrix.

16. The color correction device according to claim 15, wherein the color converter updates the color conversion in one of cases where a present time coincides with periodically predetermined times, where a user's instruction occurs, and where the projected image on the projection screen is refreshed.

17. The color correction device according to claim 15, further comprising:
    an update timing generator for generating an update timing signal when a cut point is detected from the input image which is sequence image, wherein the color converter updates the color conversion when the update timing signal is generated.

18. A color correction device for a projector, comprising:
    a color information capturer for capturing color information of an image projected on a projection surface and creating from the color information a matrix representing an output color space of the projector on the projection surface;
    a color converter for converting colors of the input image to tristimulus values based on an input color space associated with the input image and correcting the tristimulus values to compensate between incomplete human chromatic adaptation to the input color space and incomplete human chromatic adaptation to the output color space; and
    a tristimulus value converter for converting the corrected tristimulus values to colors of a corrected-color image to be projected based on the matrix.

19. The color correction device according the claim 18, wherein the color converter updates the color conversion in one of cases where a present time coincides with periodically predetermined times, where a user's instruction occurs, and where the projected image on the projection surface is refreshed.

20. The color correction device according to claim 18, further comprising:
    an update timing generator for generating an update timing signal when a cut point is detected from the input image which is sequence image, wherein the color converter updates the color conversion when the update timing signal is generated.

21. A computer readable medium encoded with a program instructing a computer to perform a color correction method for a projector, the method comprising the steps of:
    a) projecting at least one image onto a projection screen;
    b) capturing color information of an image on the projection screen on which said at least one image is projected and creating from the color information a matrix representing an output color space of the projector on the projection screen;

c) converting colors of an input image to tristimulus values based on an input color space associated with the input image and correcting the tristimulus values to compensate between incomplete human chromatic adaptation to the input color space and incomplete human chromatic adaptation to the output color space; and d) converting the corrected tristimulus values to colors of a corrected-color image to be projected based on the matrix.

22. A computer readable medium encoded with a program instructing a computer to perform a color correction method for a projector, the method comprising the steps of:

a) projecting at least one image onto a projection surface;

b) capturing color information of an image on the projection surface on which said at least one image is projected and creating from the color information a matrix representing an output color space of the projector on the projection surface;

c) converting colors of the input image to tristimulus values based on an input color space associated with the input image and correcting the tristimulus values to compensate between incomplete human chromatic adaptation to the color space and incomplete human chromatic adaptation to the output color space; and d) converting the corrected tristimulus values to colors of a corrected-color image to be projected based on the matrix.

* * * * *